United States Patent
Farrell

[11] 3,944,192
[45] Mar. 16, 1976

[54] PLASTICIZER APPARATUS FOR BALL AGITATOR ALONG SCREW FLIGHTS

[75] Inventor: John J. Farrell, Green Brook, N.J.

[73] Assignee: Farrell Patent Company, Green Brook, N.J.

[22] Filed: Dec. 19, 1973

[21] Appl. No.: 426,040

[52] U.S. Cl. .................. 259/191; 259/10; 259/97; 425/208
[51] Int. Cl.² ............................................ B29B 1/10
[58] Field of Search ........... 259/191, 192, 193, 194, 259/195, 7, 8, 9, 10, 22, 23, 24, 25, 26, 42, 43, 44, 45, 46, 65, 66, 67, 68, 69, 97, 106, 107, 108, 109, 110; 425/207, 208, 209

[56] References Cited
UNITED STATES PATENTS

| 603,411 | 5/1898 | Rutschman | 259/191 |
|---|---|---|---|
| 3,149,377 | 9/1964 | Morse | 425/207 |
| 3,530,534 | 9/1970 | Pomper | 425/209 |

FOREIGN PATENTS OR APPLICATIONS

| 1,274,248 | 9/1961 | France | 425/207 |

*Primary Examiner*—Harvey C. Hornsby
*Assistant Examiner*—James A. Niegowski
*Attorney, Agent, or Firm*—Marvin Feldman; J. B. Felshin

[57] ABSTRACT

This plasticizer screw, for advancing molten plastic to an injection mold, has a row of balls behind the flights of the screw for agitating the plastic to promote better mixing and to eliminate dead regions along the screw. The balls in a continuous row run in a groove in the shank portion of the screw and extend radially beyond the circumference of the shank portion for substantially the same distance as the helical flights of the screw thread. The raceway groove, in which the balls are held, terminates at an abutment where the balls move into a passage within the shank portion of the screw, and they travel back through this passage to an outlet end where they pass back into the other end of the raceway groove.

12 Claims, 5 Drawing Figures

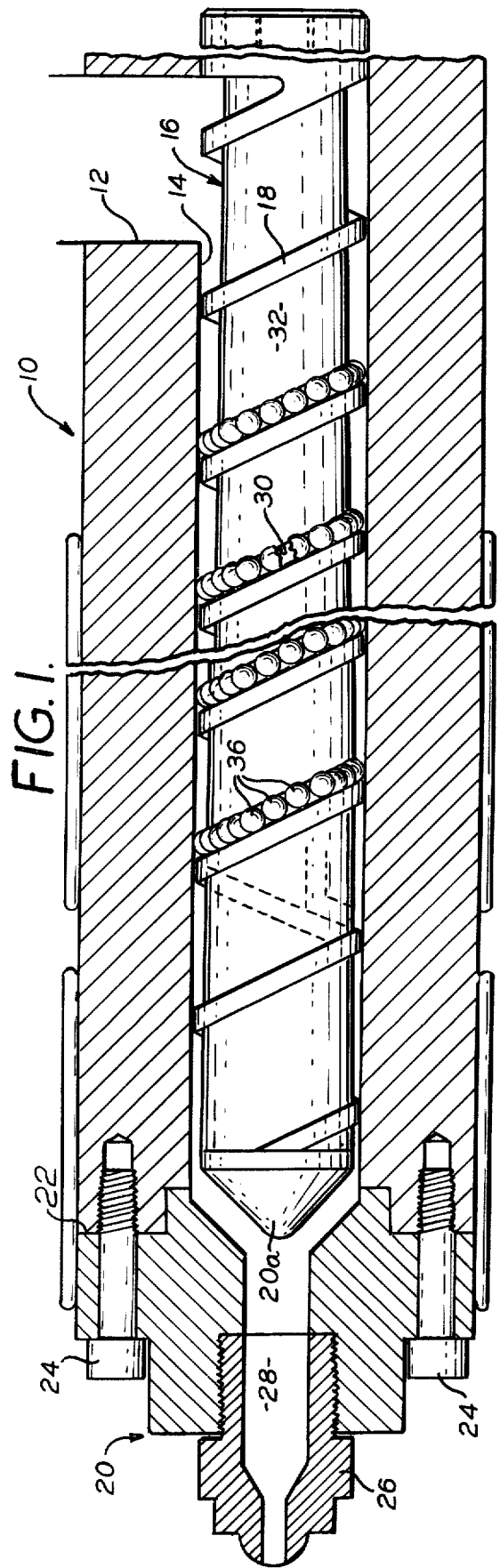
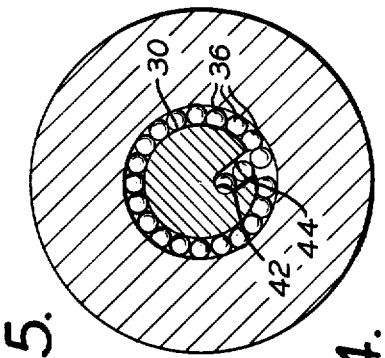
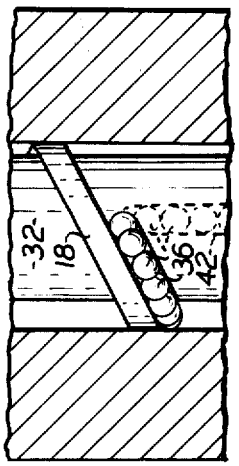
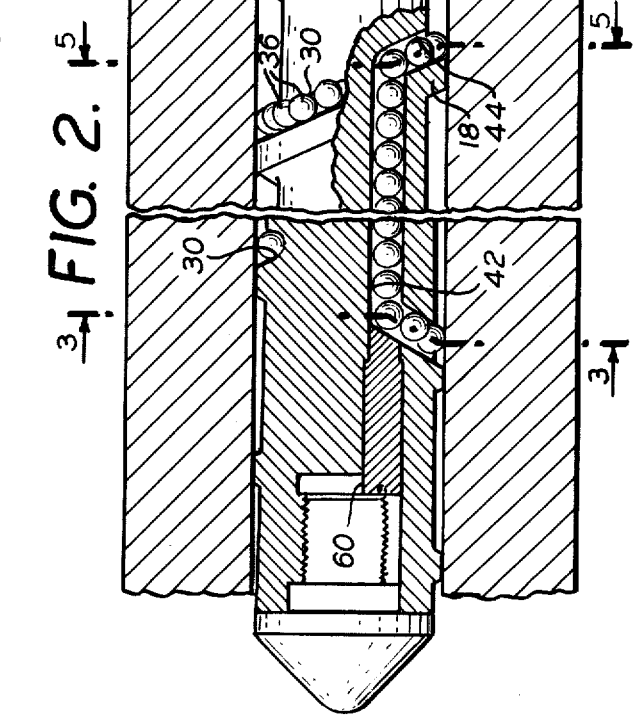

PLASTICIZER APPARATUS FOR BALL AGITATOR ALONG SCREW FLIGHTS

BACKGROUND AND SUMMARY OF THE INVENTION

A conventional type of plasticizer for injection molding machines has a screw with a helical thread that advances molten plastic along the length of a plasticizer barrel to an injection nozzle at the end of the plasticizer. These plasticizer screws have a shank portion and a helical thread extending beyond the shank portion with the outside diameter of the thread flights substantially equal to the entire diameter of the barrel. A substantial running clearance between the circumferential faces of the flights, and the inside surface of the barrel, is permissible because of the high viscosity of the plastic being conveyed.

The front surfaces of the screw flights propel the plasticized material forward with increasing pressure toward the discharge end of the screw.

Friction of the plastic material with the inside surface of the barrel and drag of the plastic on the front faces of the screw flights causes agitation and mixing of the plastic material as it advances along the barrel. There is, however, considerably less mixing, and sometimes none, in the regions near the juncture of the rearward surfaces of the flights with the shank portion of the screw. Plastic tends to remain in these regions, and with certain kind of plastic the part in these dead regions of the plasticizer sometimes decomposes and produces undesirable reaction products in the plastic that is being fed to an injection mold.

In order to assure mixing of the plastic material behind the flights, where dead regions in the plastic are likely to occur, this invention provides a groove in the shank portion immediately adjacent to the rearward face of the helical thread. This groove serves as a raceway for balls which extend above the shank portion of the screw to a height substantially equal to the circumferential surfaces of the flights of the screw thread.

This groove with the balls extends for a substantial portion of the length of the screw and there is an abutment at the forward end of the groove which causes the balls to enter a passage which extends inside the screw shank to an outlet end at the portion where the rearward end of the groove is located. As the screw rotates, these balls maintain agitation of the plastic in the region of the rearward faces of the screw thread flights.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a fragmentary view, mostly in section, showing a plasticizer apparatus comprising a barrel, a screw, and an injection nozzle;

FIG. 2 is a fragmentary view showing portions of the structure of FIG. 1 but showing the screw mostly in section;

FIG. 3 is a sectional view on the line 3—3 of FIG. 2;

FIG. 4 is a sectional view through the barrel and showing the screw in elevation at the section 4—4 of FIG. 3; and FIG. 5 is a sectional view taken on the line 5—5 of FIG. 2.

DESCRIPTION OF PREFERRED EMBODIMENT

The plasticizer apparatus shown in FIG. 1 includes a plasticizer barrel 10 having a passage 12 through which plastic material is inserted into a cylindrical chamber 14 extending axially of the barrel 10. A plasticizer screw 16 is located in the barrel and this screw has a helical thread 18 which starts from a region rearward of the inlet passage 12 and which extends to a head 20.

An end wall 22 is secured to the discharge end of the barrel 10 by fastening means comprising screws 24 which extend through the head 20 and into the end face of the barrel 10. An injection nozzle 26 screws into a center opening in the head 20.

The screw 16 is rotated in a direction to cause the screw thread 18 to advance plastic material toward the front end of the screw (toward the left in FIG. 1) and into a space 28 in the head 20 and nozzle 26. As the screw 16 continues to rotate and advance additional plastic material beyond the end of the screw, the accumulating material forces the screw 16 back (toward the right) until sufficient plastic has accumulated ahead of the screw to supply the volume of material necessary for injecting material into the cavity or cavities of an injection mold during the next injection operation of the plasticizer.

When sufficient material has been accumulated ahead of the screw, the rotation of the screw is stopped and when the injection operation is to be started, a reciprocating motor advances the screw 16 in the direction of its longitudinal axis so that the screw head 20a acts as a piston for forcing material from the nozzle 26 into an injection mold. The structure and operation thus far described are conventional and no further description of the operation is necessary for a complete understanding of this invention.

There is a groove 30 in the shank portion of the screw 16. This shank portion is designated in the drawing by the reference character 32. The groove 30 is located immediately behind each of the flights of the screw thread 18 and is continuous along most of the length of the shank portion 32 of the screw. There are balls, preferably ball bearings 36 in the groove 30 and movable along the groove 30 as a raceway.

In the construction illustrated, the balls 36 are in position to contact with the back face of each of the flights of the screw thread 18. If the groove 30 is located somewhat further back from the flights of the screw thread, it is preferable that the groove be close enough to the screw thread so that the balls can shift transversely in the groove sufficiently to touch the back faces of the screw thread flights.

The groove 30 is of such depth, in proportion to the diameter of the balls 36, that the balls are held with their upper limits at substantially the peripheral surfaces of the screw thread 18. Thus the balls 36 are held in the groove 30 by the inside surface of the cylindrical chamber 14 of the barrel.

The screw thread 18 has an outside diameter slightly less than the inside diameter of the barrel chamber 14. This is for running clearance of the screw 16 in the barrel 10. The clearance can be somewhat greater than a mere "running clearance" because the plastic material that is fed through the plasticizer is quite viscous. In the preferred embodiment of the invention, the balls 36 are of a diameter so that they extend slightly above the peripheral surfaces of the screw thread and thus provide anti-friction bearings for the screw 16 in the barrel 10.

As the screw 16 rotates, the balls 36 advance with the screw threads toward the front or discharge end of the plasticizer barrel 10. The groove 30 terminates before the end of the screw however, and the end of the groove 30 forms an abutment surface 40, best shown in FIG. 3. This abutment surface 40 slopes as shown in FIG. 3 so as to serve as a cam surface for pushing successive balls 36 into the inlet end of a passage 42 which extends inside the shank portion of the screw 16 as shown in FIG. 2. This passage 42 extends generally parallel to the axis of the screw 16 and it has an outlet passage 44 near the rearward end of the screw thread 18 and in a position to communicate with the beginning of the groove 30.

Thus balls 36 which travel forward on the outside of the screw shank 32 and along the groove 30 are thrust into the passage 42 at the forward end of the groove 30 and they travel rearwardly within the shank portion 32 of the screw 16 to an outlet end 44 of the passage 42 which communicates with the beginning of the groove 30.

The balls 36 are preferably sufficient in number to fill or substantially fill the entire length of the groove 30 and the return passage 42 so that movement of balls is promoted by pressure of adjacent balls in addition to the movement which is caused by rolling against the inside surface of the barrel 10 and by friction with the plastic material that is being advanced by the screw.

FIG. 2 shows diagrammatically a motor 50 for rotating the screw 16 through a drive shaft 52. This motor 50 is located on a carriage 54 which is moved back and forth in the direction of the axis of the screw 16 by a reciprocating hydraulic motor 56. This is conventional operating mechanism for plasticizer screws.

The groove 30 can be formed in the shank portion 32 by a machining operation. The portion of the passage 42 which extends generally parallel to the axis of the screw is preferably drilled from one end of the screw and then closed by a plug 60, shown in FIG. 2. This plug 60 has a face which forms one side of the entrance into the passage 42 and this entrance and also the outlet 44 of the passage 42 are preferably formed by drilling through the side of the shank at the appropriate angle, as also shown in FIG. 2.

Movement of the balls is also caused by the fact that the pressure of the screw thread 18 against the plastic material in the barrel becomes progressively higher as the plastic material is forced toward the front end of the plasticizer barrel. Thus the pressure of the plastic material at the entrance end of the passage 42 is very much higher than the pressure of the plastic at the outlet end 44 of the passage 42. This substantial difference in pressure tends to force balls 36 into the passage 42 at its forward end and to push the balls 36 rearwardly through the passage 42 and out through the outlet 44 at the rearward end of the passage 42. Some plastic is carried rearwardly through the passage 42 with the balls but the volume of plastic is small because the cross section of the passage 42 is occupied mostly by the line of balls advancing rearwardly through the passage.

The outlet end 44 of the passage 42 is sloped, as shown in FIG. 5, so as to exert a cam action that starts the balls 36 moving in a direction having some circumferential component in the direction in which they have to advance in the groove 30 as they leave the outlet end 44. Thus the balls 36 never come up against a surface which does not have a slope to bias the balls to move in the desired direction when subjected to pressure by an adjacent ball to the rear.

The preferred embodiment of the invention has been illustrated and described, but changes and modifications can be made and some features can be used in different combinations without departing from the invention as defined in the claims.

What is claimed is:

1. Plasticizer apparatus for injection molding machines including in combination a plasticizer screw having a generally cylindrical shank portion and a helical thread portion that extends radially beyond the circumference of the shank portion and that forms flights for propelling plastic material lengthwise of the screw in a forward direction as the screw rotates, a helical groove in the cylindrical surface of the shank portion immediately adjacent to the rearward side of the thread portion, the successive convolutions of the helical thread portion being axially spaced from one another with generally cylindrical sections of the shank portions between them, balls in the groove, the balls being in a continuous helical line and located in the groove adjacent to one another whereby the balls form a substantially continuous line of balls and movement of any ball along the length of the groove can move the next ball by contact therewith, and said balls being movable in the groove to agitate plastic material which is adjacent to the rearward surfaces of the flights when the plasticizer apparatus is in operation.

2. The plasticizer apparatus described in claim 1 characterized by the depth of the groove in the circumferential surface of the shank portion, in which the groove is formed, being substantially less than the diameter of the balls whereby the balls extend radially above said circumferential surface of the shank portion and the groove merely serves as a race for the balls.

3. Plasticizer apparatus for injection molding machines including in combination a plasticizer screw having a shank portion and a helical thread portion that extends radially beyond the circumference of the shank portion and that forms flights for propelling plastic material lengthwise of the screw in a forward direction as the screw rotates, a helical groove in the surface of the shank portion adjacent to the rearward side of the thread portion, balls in the groove and movable in the groove to agitate plastic material which is adjacent to the rearward surfaces of the flights when the plasticizer apparatus is in operation, characterized by the balls being located in the groove adjacent to one another whereby the balls form a substantially continuous line of balls and movement of any ball along the length of the groove can move the next ball by contact therewith, further characterized by an abutment surface at the forward end of the groove, a passageway extending lengthwise of the screw and having an entrance end at said abutment surface so that balls moving up to the abutment surface can enter the passageway, said passageway being of sufficient cross section for balls to travel through the passageway, and an outlet end of the passageway located adjacent to the rearward end of the line of balls and from which balls can re-enter the groove.

4. The plasticizer apparatus described in claim 3 characterized by the balls being of such diameter that they extend above the shank portion and to substantially the top of the flight.

5. The plasticizer apparatus described in claim 4 characterized by a barrel that surrounds the screw, the outside diameter of the flights being slightly less than the inside diameter of the barrel so that rotation of the screw pushes plastic material lengthwise through the barrel, the balls extending somewhat beyond the top of the flights and contacting with the inside surface of the barrel whereby they serve as anti-friction bearings between the screw and the barrel.

6. The plasticizer apparatus described in claim 4 characterized by a barrel surrounding the screw and having a cylindrical inside surface of somewhat larger diameter than the flights of the screw but with clearance between the circumferential surfaces of the flights and the inside surface of the barrel so that rotation of the screw advances plasticized material lengthwise along the inside of the barrel, said inside surface of the barrel holding the balls in the groove in the shank portion of the screw.

7. The plasticizer apparatus described in claim 3 characterized by the passageway extending lengthwise through the interior of the shank portion of the screw.

8. The plasticizer apparatus described in claim 7 characterized by there being a plurality of flights between the opposite ends of the passageway through which the balls pass inside the shank portion of the screw, a barrel surrounding the screw and having an inside cylindrical face that confronts the circumferential surfaces of the flights with clearance between the flights and the barrel surface so that plasticized material is advanced lengthwise of the barrel by the rotation of the screw and the pressure on the plasticized material increases progressively as the material is forced forward by the flights, the higher pressure of the plasticized material serving to force balls into the forward end of the passageway and to thrust the balls rearwardly in the passageway toward the other end of the passageway which is subjected to much less pressure of the plasticized material.

9. The plasticizer apparatus described in claim 7 characterized by the abutment at the entrance end of the return passageway being sloped in a direction to act as a cam surface for urging successive balls downwardly into the passageway, and the discharge end of the passageway having a sloping bottom surface that serves as an incline for moving balls upward to the groove in the shank portion of the screw as the balls move rearwardly at the discharge end of the passageway.

10. The plasticizer apparatus described in claim 7 characterized by the passageway having a diameter slightly greater than the diameter of the balls but less than approximately 1 ½ times the diameter of the balls.

11. The plasticizer apparatus described in claim 6 characterized by the motor means connected with the screw, one of the motor means imparting rotation to the screw and the other of said motor means imparting axial movement to the screw with respect to the barrel, the motor means being operable simultaneously or independently of one another.

12. The plasticizer apparatus of claim 1, wherein said balls occupy substantially the entire groove.

* * * * *